United States Patent
Lee et al.

(10) Patent No.: US 8,343,330 B2
(45) Date of Patent: *Jan. 1, 2013

(54) MICROFLUIDIC DEVICE FOR ELECTROCHEMICALLY REGULATING PH OF FLUID AND METHOD OF REGULATING PH OF FLUID USING THE MICROFLUIDIC DEVICE

(75) Inventors: Hun-joo Lee, Seoul (KR); Joon-ho Kim, Seongnam-si (KR); Sung-young Jeong, Yongin-si (KR); Hee-kyun Lim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1116 days.

This patent is subject to a terminal disclaimer.

(21) Appl. No.: 11/558,940

(22) Filed: Nov. 13, 2006

(65) Prior Publication Data

US 2007/0138012 A1    Jun. 21, 2007

(30) Foreign Application Priority Data

Dec. 21, 2005  (KR) .......................... 10-2005-0126917

(51) Int. Cl.
*C25B 9/00*   (2006.01)
*C02F 1/461*  (2006.01)
*C02F 1/66*   (2006.01)
(52) U.S. Cl. ......... 205/742; 205/746; 204/242; 204/252
(58) Field of Classification Search .................. None
See application file for complete search history.

(56) References Cited

U.S. PATENT DOCUMENTS

| 4,331,523 | A  | * | 5/1982  | Kawasaki ................. 205/630 |
| 4,880,647 | A  | * | 11/1989 | Hatzidimitriu et al. ....... 426/239 |
| 5,685,966 | A  |   | 11/1997 | Aaron et al. |
| 5,795,459 | A  | * | 8/1998  | Sweeney .................... 205/701 |
| 5,980,703 | A  | * | 11/1999 | Yamada et al. ............... 204/253 |
| 6,139,714 | A  | * | 10/2000 | Livshits .................... 205/516 |
| 6,235,186 | B1 | * | 5/2001  | Tanaka et al. ............... 205/521 |
| 6,837,986 | B2 | * | 1/2005  | Hanaoka .................... 205/746 |
| 7,914,660 | B2 | * | 3/2011  | Lee et al. .................. 205/629 |
| 7,938,945 | B2 | * | 5/2011  | Lee et al. .................. 204/450 |
| 7,955,842 | B2 | * | 6/2011  | Lee et al. .................. 435/306.1 |
| 8,114,261 | B2 | * | 2/2012  | Lee et al. .................. 204/600 |
| 2002/0074241 | A1 | * | 6/2002 | Natsume .................... 205/688 |
| 2005/0126928 | A1 | * | 6/2005 | Hung et al. ................. 205/746 |

(Continued)

FOREIGN PATENT DOCUMENTS

EP     1 314 472 A1     5/2003

(Continued)

OTHER PUBLICATIONS

"Palladium-hydrogen electrodes for coulometric titration analysis of acids and bases"; Authors: Bhadra Munasiri, et al.; J. Electroanal. Chem., 332 (1992) pp. 333-337.

(Continued)

*Primary Examiner* — Harry D Wilkins, III
(74) *Attorney, Agent, or Firm* — Cantor Colburn LLP

(57) ABSTRACT

A microfluidic device which electrochemically regulates a pH of a fluid, and a method of regulating a pH of a fluid using the microfluidic device, include a chamber which includes a cathode formed of a metal adsorbing hydrogen gas, and an anode formed of a metal having a higher standard oxidation potential than, and does not react with, water.

17 Claims, 7 Drawing Sheets

U.S. PATENT DOCUMENTS

| | | | |
|---|---|---|---|
| 2005/0247558 A1* | 11/2005 | Anex et al. ............... 204/275.1 |
| 2006/0076248 A1* | 4/2006 | Kindred ...................... 205/743 |
| 2006/0169598 A1* | 8/2006 | Lee et al. .................... 205/755 |
| 2007/0017810 A1* | 1/2007 | Lee et al. .................... 204/520 |
| 2007/0034504 A1* | 2/2007 | Lee et al. .................... 204/260 |

FOREIGN PATENT DOCUMENTS

| | | |
|---|---|---|
| EP | 1 672 459 A2 | 6/2006 |
| EP | 1 804 150 A1 | 7/2007 |
| JP | 02-275397 A | 11/1990 |
| JP | 2275397 A | 11/1990 |
| JP | 04-346804 A | 12/1992 |
| JP | 4346804 A | 12/1992 |
| WO | 98/22813 A1 | 5/1998 |

OTHER PUBLICATIONS

Japanese Office Action with English Translation for Japanese Application No. 2006-301359 dated Nov. 4, 2009.

Extended European Search Report for Application No. 06124673.2-2206/1804035 dated May 2, 2012.

* cited by examiner

MICROFLUIDIC DEVICE FOR ELECTROCHEMICALLY REGULATING PH OF FLUID AND METHOD OF REGULATING PH OF FLUID USING THE MICROFLUIDIC DEVICE

This application claims priority to Korean Patent Application No. 10-2005-0126917, filed on Dec. 21, 2005, and all the benefits accruing therefrom under 35 U.S.C. §119, the contents of which in its entirety are herein incorporated by reference.

BACKGROUND OF THE INVENTION

1. Field of the Invention

The present invention relates to a microfluidic device which electrochemically regulates the pH of a fluid therein and a method of regulating the pH of a fluid in a microfluidic device.

2. Description of the Related Art

A microfluidic device is a device including an inlet, an outlet, a reaction chamber, and a microchannel connecting the inlet, the outlet, and the reaction chamber. The microfluidic device also includes a micropump for transferring fluids, a micromixer for mixing the fluids, a microfilter for filtering the fluids, and various other components, in addition to the microchannel.

Microfluidic devices are well known to those of ordinary skill in the art and are used in microanalysis devices such as lab-on-a-chips ("LOCs"), which perform a series of biological analysis processes including cell enrichment, cell lysis, biomolecule refinement, nucleic acid amplification and separation, protein separation, hybridization reaction, and detection.

Each step needs a different pH in order to perform such various biological analysis processes as described above. A conventional method of regulating pH in a biological analysis process is performed by adding or removing an acid solution, a basic solution, a neutral solution or a buffer solution. However, when regulating pH, the addition or removal of such a pH-regulating solution in a microfluidic device requires a separate device and process. Also, a sample solution in the microfluidic device is undesirably diluted.

Such problems regarding the addition of a pH-regulating solution or the need for a separate device may be serious in a microfluidic device using microvolumes. In addition, the dilution can also be a problem when taking or amplifying a target sample. Moreover, when the added pH-regulating material may act as an inhibitor in a later performed biological analysis process, the added pH-regulating material should be removed to prevent unreliable results.

Electrolysis may be used as a method for solving the problems arising with the conventional method of externally injecting a pH-regulating reagent. For example, pH can be regulated by H+ and OH− ions generated on an anode and a cathode, respectively, when electrolyzing water.

However, in the conventional method, gases such as hydrogen and oxygen are generated as a result of the electrolysis. The generated gases obstruct solution flow in the microchannel, which makes it difficult to flow the solution to a next chamber. Moreover, the gases in solution in the microsystem are very likely to adversely affect mixing, a reaction, and heat and mass transfer due to the interfaces between the gases and the solution.

In order to eject the gases which cause the above problems, a gas exhaust port and a separate degassing device are required (see, for example, U.S. Pat. No. 5,685,966.) However, when a separate gas exhaust port and a degassing device are attached to a microfluidic device, the miniaturization of the microfluidic device is limited, the manufacturing processes are complicated, the manufacturing costs are high, and the processes of operating the microfluidic device are complicated.

BRIEF SUMMARY OF THE INVENTION

It is one aspect of the present invention to provide a microfluidic device for electrochemically regulating a pH of fluid therein without generation of gases in a chamber.

Another aspect of the present invention provides a method of regulating a pH of fluid in a microfluidic device through electrolysis using the microfluidic device.

According to an exemplary embodiment of the present invention, there is provided a microfluidic device which electrochemically regulates a pH of a fluid, the device includes; a chamber including a cathode and an anode, wherein the cathode is formed of a metal which adsorbs hydrogen gas and the anode is formed of a metal which has a higher standard oxidation potential than, and does not react with, water.

In one exemplary embodiment the cathode may be formed of palladium (Pd).

In one exemplary embodiment the anode may be formed of a material selected from the group consisting of copper (Cu), lead (Pb), silver (Ag), chromium (Cr), titanium (Ti), nickel (Ni), zinc (Zn), iron (Fe), and tin (Sn).

In one exemplary embodiment the chamber may further include an ion exchange material which divides the chamber into a cathode chamber which includes the cathode electrode and an anode chamber which includes the anode electrode.

In one exemplary embodiment the ion exchange material may transmit an electric current and may substantially prevent the transmission of ions therethrough.

In one exemplary embodiment the ion exchange material may form a membrane substantially simultaneously with a crosslinking reaction.

In one exemplary embodiment the chamber may further comprise a fluid inlet and a fluid outlet.

In one exemplary embodiment the chamber may further comprise a micropump.

According to another exemplary embodiment of the present invention, there is provided a method of electrochemically regulating a pH of a fluid in a microfluidic device including a chamber including a cathode, an anode and an ion exchange material which divides the chamber into a cathode chamber which includes the cathode electrode and an anode chamber which includes the anode electrode, and wherein the cathode is formed of a metal which adsorbs hydrogen gas and the anode is formed of a metal which has a higher standard oxidation potential than, and does not react with, water, the method includes; flowing a solution containing ions which have a higher or lower standard oxidization potential than water into the anode chamber, flowing a solution containing ions which have a lower standard reduction potential than water into the cathode chamber, and inducing electrolysis in each of the anode and cathode chambers by applying an electric current between the anode and cathode.

In one exemplary embodiment the ions which have a lower standard oxidization potential than water may be at least one selected from the group consisting of $NO^{3-}$, $F^-$, $SO_4^{2-}$, $PO_4^{3-}$ and $CO_3^{2-}$.

In one exemplary embodiment the ions which have a higher standard oxidization potential than water may be $Cl^-$ ions.

In one exemplary embodiment the ions which have a lower standard reduction potential than water may be at least one selected from the group consisting of $Na^+$, $K^+$, $Ca^{2+}$, $Mg^{2+}$ and $Al^{3+}$.

In one exemplary embodiment the pH may be regulated according to the direction of the application of the electric current, the magnitude of the electric current, the duration of the electric current application, the width of at least one of the anode or the cathode, or the thickness of the ion exchange material.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
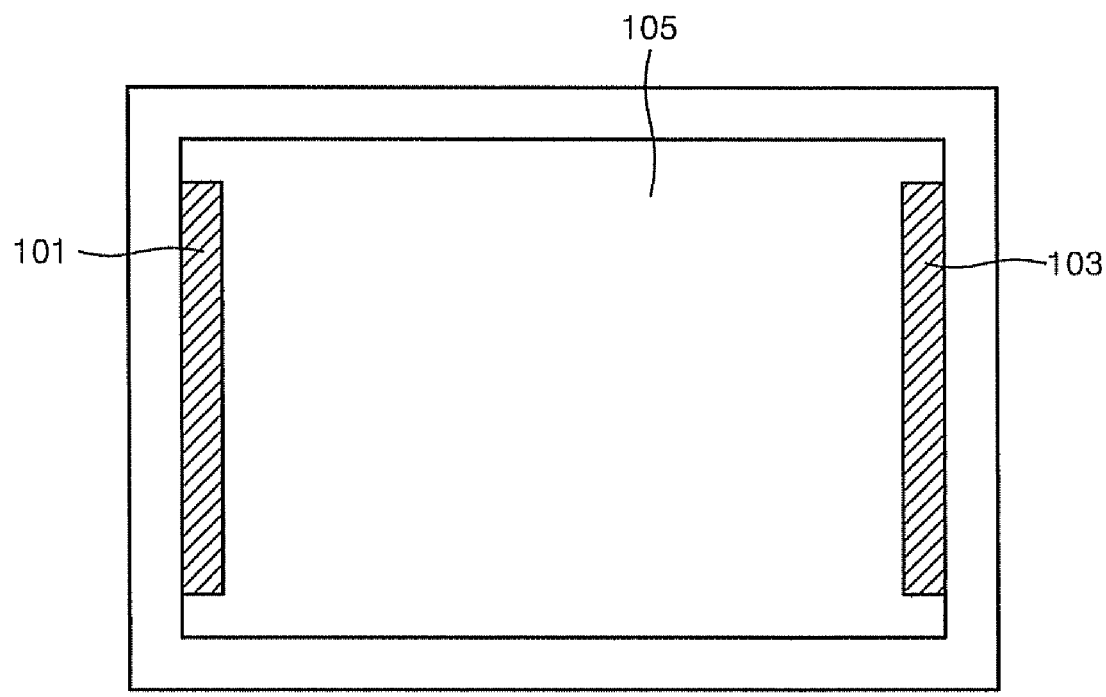
FIG. 1 is a side view illustrating an exemplary embodiment of a microfluidic device according to the present invention.

The present invention now will be described more fully hereinafter with reference to the accompanying drawings, in which exemplary embodiments of the present invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described more fully with reference to the accompanying drawings.

An exemplary embodiment of a microfluidic device for electrochemically regulating a pH of fluid according to the present invention includes a chamber equipped with a cathode electrode formed of a metal which adsorbs hydrogen gas; and an anode electrode formed of a metal which has a higher standard oxidation potential than water and does not react with water. The microfluidic device does not generate gases therein.

Exemplary embodiments of the cathode electrode are not limited to a certain metal, and can include any metal which can adsorb hydrogen gas.

Exemplary embodiments of the cathode electrode can be composed of palladium (Pd). Pd is known to be capable of adsorbing a large amount of hydrogen (Bhadra Munasiri, et al., J. Electroanal. Chem., pp 333-337, 1992). When the cathode electrode is composed of Pd, the Pd can prevent the generation of gas by adsorbing hydrogen gas generated near the cathode electrode by electrolysis of water. Accordingly, the Pd cathode electrode can increase the pH of a solution nearby since OH— generated by water electrolysis is not adsorbed, thereby creating a localized region of higher pH.

Moreover, exemplary embodiments of the anode electrode are not limited to a certain metal, and may be formed of any metal which has a higher standard oxidization potential than water and does not react with water.

When electrolyzing water, oxygen gas generated at an anode electrode forms bubbles, and the production of hydrogen ions lowers the pH of a solution. However, the exemplary embodiment of a microfluidic device according to the present invention using a metal having a higher standard oxidization potential than water and does not generate gas, because, instead of the water being electrolyzed, the metal is oxidized. In addition, even if a small amount of oxygen is generated due to a rise in voltage, a change in solute, or other factors, it will form a metal oxide by combining with the metal, so that bubbles due to oxygen are not generated.

A metal which can react with water is not desirable for the anode electrode of the microfluidic device, even if the metal has a higher standard oxidation potential than water. Examples of metals which are not desirable for the anode electrode include K, Ca, Na, and Mg.

Furthermore, a metal which quickly forms an oxide film and increases resistance is not suitable for the anode electrode, even through the metal has a higher standard oxidation potential than water. For example, Al, which very quickly oxidizes into alumina, is not suitable for the anode electrode.

Exemplary embodiments of the anode electrode can be formed of a metal selected from the group consisting of Cu, Pb, Ag, Cr, Ti, Ni, Zn, Fe, and Sn.

Hereinafter, an exemplary embodiment of a microfluidic device according to the present invention with a specific shape and structure will be described with reference to FIG. 1. The shape, structure, size, and other characteristics, of an exemplary embodiment of a microfluidic device according to the present invention are not limited thereto.

FIG. 1 is a side view of an exemplary embodiment of a microfluidic device electrochemically regulating a pH of a fluid therein according to the present invention.

Referring to FIG. 1, the exemplary embodiment of a microfluidic device according to the present embodiment includes a chamber 105 equipped with a cathode electrode 101 formed of a metal capable of adsorbing hydrogen gas as described above and an anode electrode 103 formed of a metal which has a higher standard oxidation potential than water and which does not react with water as described above.

In an exemplary embodiment of a microfluidic device according to the present invention, a chamber, an anode chamber, and a cathode chamber refer to spaces which can accommodate materials such as a fluid. The chamber, the anode chamber, and the cathode chamber may be microchambers which can accommodate materials with a volume of about a microliter or less, but are not limited thereto. Exemplary embodiments of the chamber can be selected from the group consisting of a cell lysis chamber, a nucleic acid separation/refinement chamber, a nucleic acid amplification chamber, a hybridization chamber, and a signal detection chamber. The chamber can be connected to other various chambers through microchannels. Therefore, the microfluidic device according to an embodiment of the present invention can be a LOC which can electrochemically regulate the pH of a fluid containing biomolecules.

In an exemplary embodiment of the present invention, the chamber may additionally include an ion exchange material. In such an exemplary embodiment, the chamber may be divided by the ion exchange material into a cathode chamber including a cathode electrode and an anode chamber including an anode electrode.

When an ion exchange material, one exemplary embodiment of which includes an ion exchange membrane, is used, an acidic solution generated in the anode electrode, an alkaline solution generated in the cathode electrode, and metal ions are separated from one another, so that it becomes easier to separately regulate pH in the cathode chamber and the anode chamber. In addition, it is also possible to regulate pH to a higher level. In addition, when lysing cells by regulating pH as described above, the use of an ion exchange material may prevent the DNA of the lysed cells from being moved and adsorbed by the anode electrode.

In an exemplary embodiment of the present invention, the ion exchange material transmits an electric current generated in each of the chambers but does not transmit ions generated therein. More specifically, the ion exchange material may transmit an electric current, but not hydrogen ions and hydroxide ions.

Exemplary embodiments of the ion exchange membrane can be a cation exchange membrane or an anion exchange membrane.

In one exemplary embodiment of the present invention, the cation exchange membrane transmits cations but almost completely prevents the transmission of anions. In an alternative exemplary embodiment, the anion exchange membrane transmits anions but almost completely prevents the transmission of cations.

Exemplary embodiments of the cation exchange membrane may be a strong acid exchange membrane including sulphur trioxide ($SO_3$) (such as Nafion™ commercially available from Dupont) or a weak acid exchange membrane including a member of the —COO-group.

Exemplary embodiments of the anion exchange membrane may be a strong base exchange membrane including $N^+(CH_3)$ or a weak base exchange membrane including $N(CH_3)_2$. Exemplary embodiments of the cation and anion exchange membranes are well known to those of ordinary skill in the art, and can be easily purchased. For example, the ion exchange membranes may include Nafion™ of Dupont, Dowex™ of Aldrich, Diaion™ of Aldrich, or various other materials which are available on the market.

Figure 2:
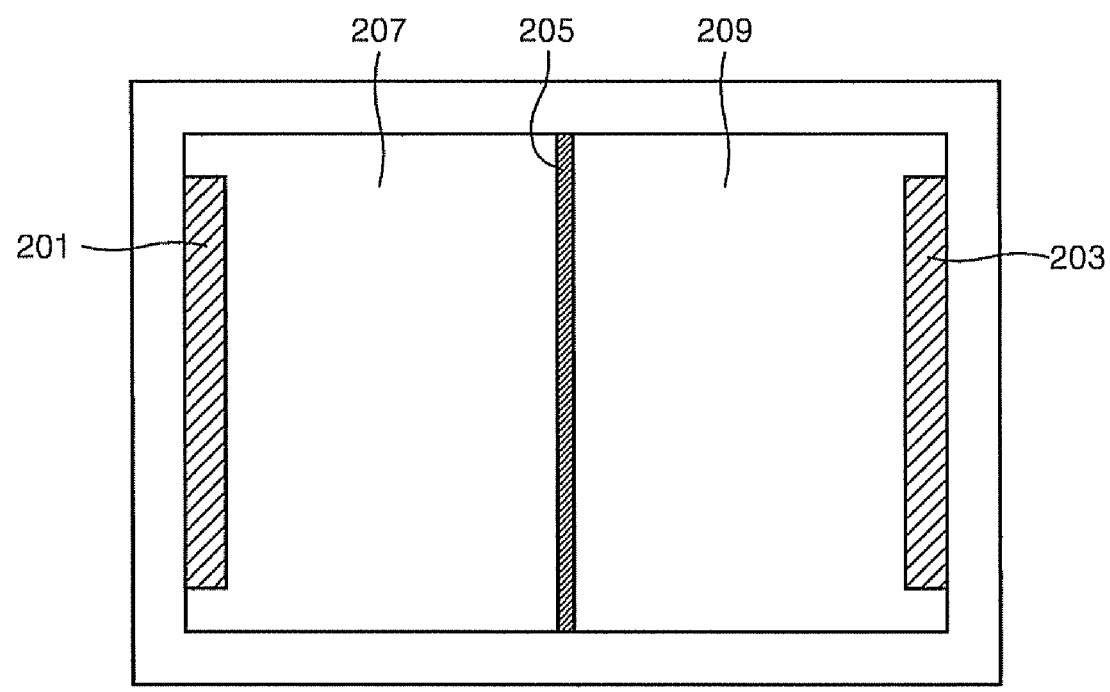
FIG. 2 is a side view illustrating another exemplary embodiment of a microfluidic device according to the present invention.

FIG. 2 is a side view illustrating another exemplary embodiment of a microfluidic device according to the present invention.

Referring to FIG. 2, a chamber additionally includes an ion exchange membrane 205. The chamber is divided by the ion exchange membrane 205 into a cathode chamber 207 having a cathode electrode 201 and an anode chamber 209 having an anode electrode 203. An exemplary embodiment of the cathode electrode 201 is formed of a metal which adsorbs hydrogen gas. An exemplary embodiment of the anode electrode 203 is formed of a metal which has a higher standard oxidation potential than water and which does not react with water.

Figure 3A:
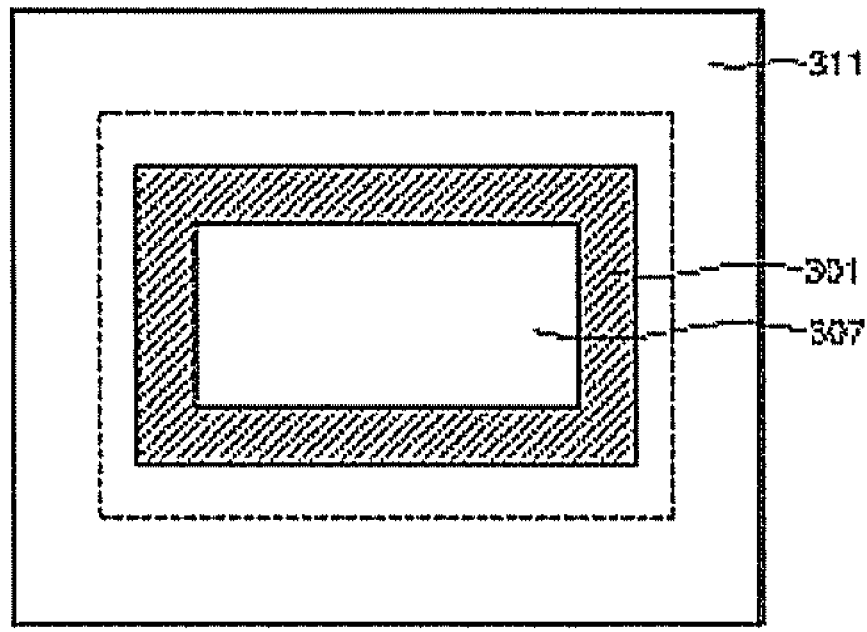
FIG. 3A is a plan view illustrating another exemplary embodiment of a microfluidic device according to the present invention.
Figure 3B:
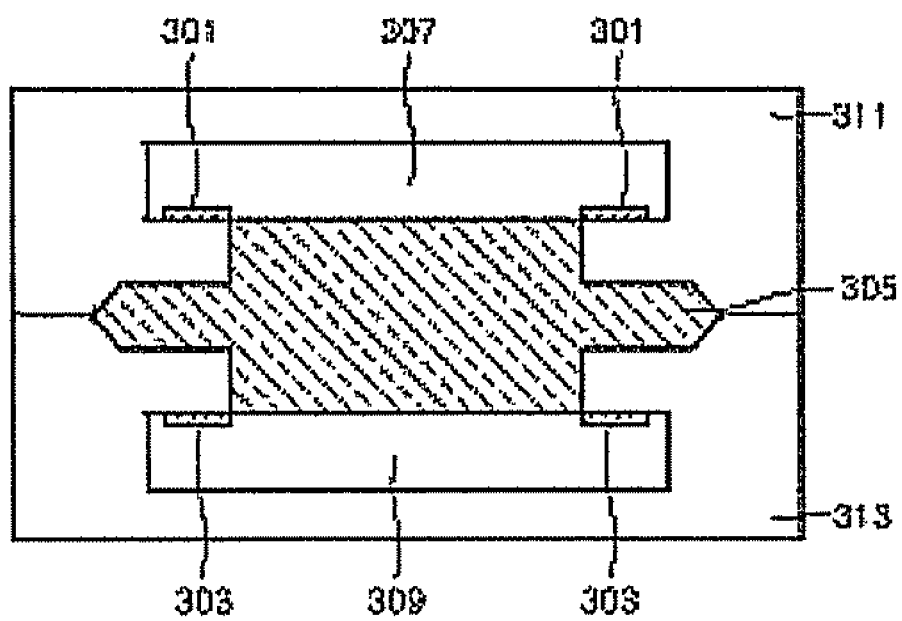
FIG. 3B is a cross-sectional view of the exemplary embodiment of a microfluidic device in FIG. 3A.

FIG. 3A is a plan view illustrating another exemplary embodiment of a microfluidic device according to the present invention, and FIG. 3B is a cross-sectional view of the exemplary embodiment of a microfluidic device of FIG. 3A.

Referring to FIGS. 3A and 3B, the exemplary embodiment of a microfluidic device according to the present invention includes: an ion exchange material 305; an anode chamber 307 one side of which contacts the ion exchange material 305; an anode electrode 301 disposed in the anode chamber 307 along the edge of the ion exchange material 305; a cathode chamber 309 one side of which contacts the ion exchange material 305; and a cathode electrode 303 disposed in the cathode chamber 309 along the edge of the ion exchange material 305. The anode chamber 307 is at least partially surrounded by a first substrate 311 and the cathode chamber 309 is at least partially surrounded by a second substrate 313. The cathode electrode 303 is formed of a metal which adsorbs hydrogen gas, and the anode electrode 301 is formed of a metal which has a higher standard oxidation potential than, and does not react with, water.

When the ion exchange material 305 forms a membrane simultaneously with a crosslinking reaction, the ion exchange membrane can be fixed by a frame. In one exemplary embodiment in order to enhance the binding force between the ion exchange material and the frame, the frame may be V-shaped as shown in the area where the first substrate 311 and the second substrate 313 meet in FIG. 3B.

Figure 4A:
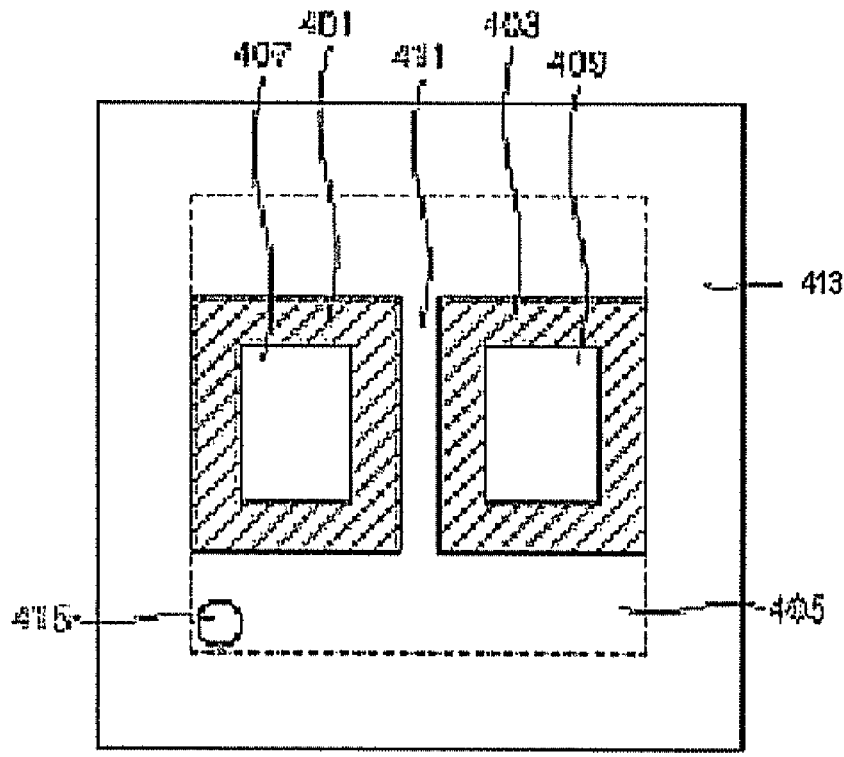
FIG. 4A is a plan view illustrating another exemplary embodiment of a microfluidic device according to the present invention.
Figure 4B:
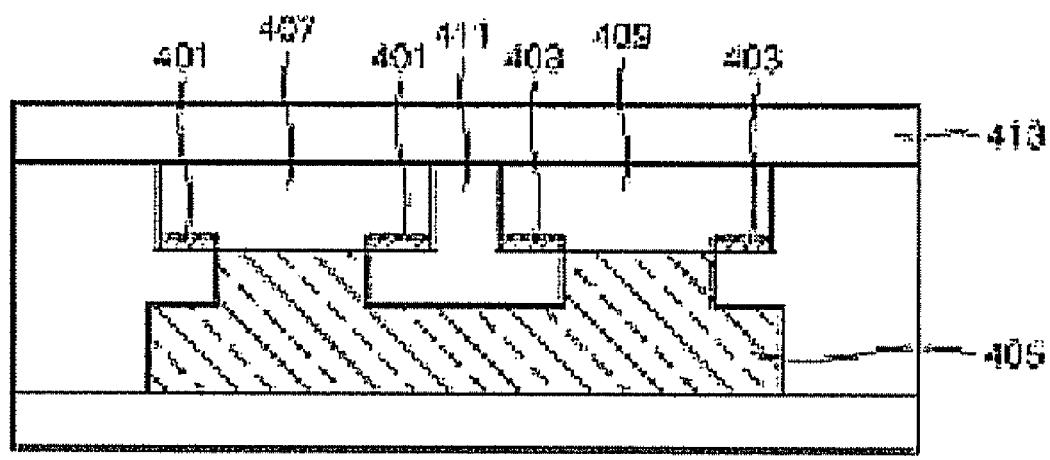
FIG. 4B is a cross-sectional view of the exemplary embodiment of a microfluidic device in FIG. 4A.

FIG. 4A is a plan view illustrating another exemplary embodiment of a microfluidic device according to the present invention, and FIG. 4B is a cross-sectional view of the exemplary embodiment of a microfluidic device of FIG. 4A.

Referring to FIGS. 4A and 4B, the exemplary embodiment of a microfluidic device according to the present invention includes: an ion exchange material 405; an anode chamber 407 one side of which contacts the ion exchange material 405; an anode electrode 401 disposed in the anode chamber 407 along the edge of the ion exchange material 405; a cathode chamber 409 one side of which contacts the ion exchange material 405; and a cathode electrode 403 disposed in the cathode chamber 409 along the edge of the ion exchange material 405. The boundary of the anode chamber 407 and the cathode chamber 409 are separated by a non-conducting material 411.

The cathode electrode 403 is formed of a metal which adsorbs hydrogen gas, and the anode electrode 401 is formed of a metal which has a higher standard oxidation potential than, and does not react with, water.

The anode chamber 407 and the cathode chamber 409 are surrounded by a substrate 413, and the substrate may additionally include an inlet port 415 for the ion exchange material.

Figure 5A:
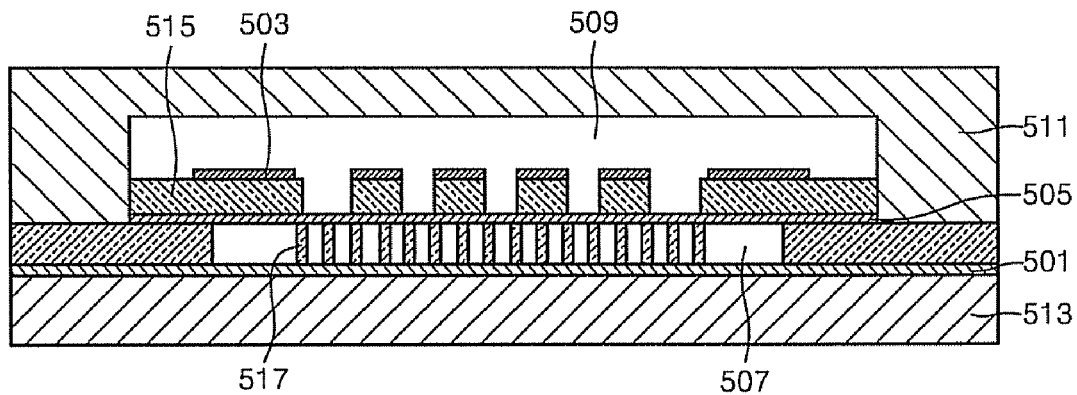
FIG. 5A is a cross-sectional view of another exemplary embodiment of a microfluidic device according to the present invention.
Figure 5B:
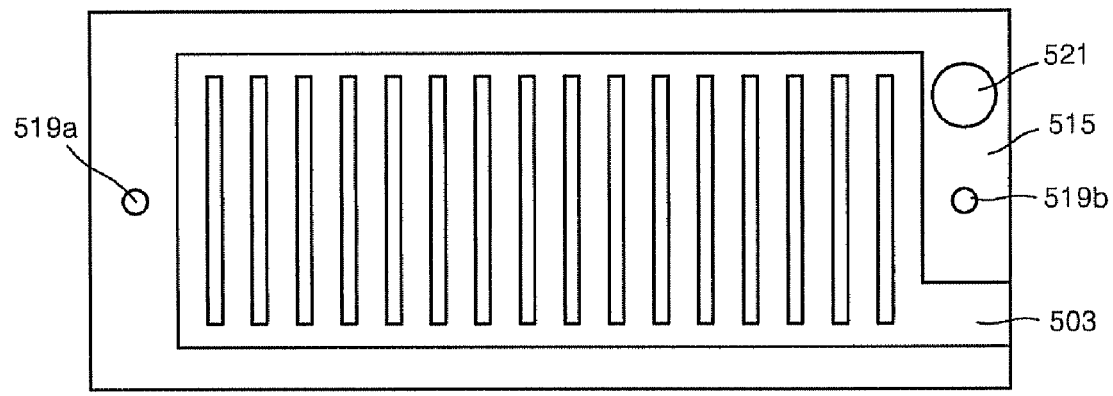
FIG. 5B is a top plan view illustrating an exemplary embodiment of an anode electrode in the exemplary embodiment of a microfluidic device in FIG. 5A.

FIG. 5A is a cross-sectional view of another exemplary embodiment of a microfluidic device according to the present invention, and FIG. 5B is a top plan view illustrating an exemplary embodiment of an anode electrode of the exemplary embodiment of a microfluidic device of FIG. 5A.

Referring to FIG. 5A, the exemplary embodiment of a microfluidic device includes: an ion exchange membrane 505; an anode chamber 509, one side of which is in contact with the ion exchange membrane 505 and which includes a ladder-shaped anode electrode 503 (ladder shaped as seen in FIG. 5B) and an anode electrode support part 515 supporting the anode electrode 503; and a cathode chamber 507 one side of which contacts the opposing surface of the ion exchange membrane 505 and which includes a cathode electrode 501. The ladder-shaped anode electrode 503 is formed on a surface of the anode electrode support part 515, and an opening is formed in the anode electrode support part 515 substantially conforming to the shape of the ladder-shaped anode electrode 503. The surface of the anode electrode support part 515 opposite the anode electrode 503 contacts and supports the ion exchange membrane 505. A pillar structure 517 is formed on the cathode electrode 501 and contacts and supports the ion exchange membrane 505. The pillar structure 517 accelerates bimolecular adsorption.

Exemplary embodiments of the cathode electrode 501 are formed of a metal which adsorbs hydrogen gas, and the anode electrode 503 is formed of a metal which has a higher standard oxidation potential than, and does not react with, water.

In the exemplary embodiment of a microfluidic device of FIGS. 5A and 5B, the anode electrode support part 515 and the pillar structure 517 support and prevent swelling of the ion exchange membrane 505, thereby minimizing a change in volume of the anode and cathode chambers 509 and 507, respectively. In addition, the ladder shape of the anode electrode 503 facilitates current flow and enables efficient pH regulation.

In an exemplary embodiment of a microfluidic device according to the present invention, a solution containing ions having a higher or lower standard oxidization potential than water, for example, an electrolyte, can be flowed into the anode chamber 509. Exemplary embodiments of ions having a lower standard oxidation potential than water can be at least one kind of anions selected from among $NO_3^-$, $F^-$, $SO_4^{2-}$, $PO_4^{3-}$ and $CO_3^{2-}$. In addition, exemplary embodiments of ions having a higher standard oxidation potential than water can be $Cl^-$. However, the present invention is not limited to the ions defined above. $Cl^-$ ions, which have a higher standard oxidation potential than water, are especially suited for the purpose of cell lysis.

In another exemplary embodiment of a microfluidic device according to the present invention, a solution containing ions having a lower standard reduction potential than water can be flowed into the cathode chamber. Exemplary embodiments of ions having a lower standard oxidization potential than water include cations, such as $Na^+$, $K^+$, $Ca^{2+}$, $Mg^{2+}$, and $Al^{3+}$, and various other cations, but the present invention is not limited thereto.

In an exemplary embodiment of the present invention, at least one of the chambers, the anode chamber and the cathode chamber, can additionally include an inlet through which a solution is supplied and an outlet through which a solution can flow out. It is not necessary that the inlet and the outlet are separately formed. Instead, alternative exemplary embodiments include configurations wherein a single port can be used as both the inlet and the outlet.

Referring to FIG. 5B, the cathode chamber includes an inlet 519a, an outlet 519b, and a power connection part 521.

In an exemplary embodiment of the present invention, at least one of the chambers, the anode chamber and the cathode chamber, can additionally include a micropump for flowing a fluid in and out.

The present invention also provides a method of regulating a pH of a fluid by electrolysis in a microfluidic device.

In an exemplary embodiment of a pH regulating method according to the present invention, a pH of a fluid is regulated by electrolysis using an exemplary embodiment of a microfluidic device according to the present invention, wherein the exemplary embodiment of a microfluidic device does not contain an ion exchange material (such as the exemplary embodiment of a microfluidic device shown in FIG. 1).

In another exemplary embodiment of a pH regulating method according to the present invention, a pH of a fluid is regulated by electrolysis using an exemplary embodiment of a microfluidic device according to the present invention, wherein the exemplary embodiment of a microfluidic device contains an ion exchange material (such as the exemplary embodiment of a microfluidic device shown in FIGS. 2 through 5B).

In the exemplary embodiment of a pH regulating method where an ion exchange material, for example, an ion exchange membrane, is used, an acidic solution is generated in the anode electrode, an alkaline solution is generated in the cathode electrode, and metal ions are separated from one another, so that it becomes easier to separately regulate pH in the cathode chamber and the anode chamber. In addition, it is also possible to regulate pH to a higher level, e.g. raise or lower the pH to a greater degree. In addition, when lysing cells by regulating pH as described above, it DNA of the lysed cells can be prevented from moving towards and being adsorbed by the anode electrode.

Another exemplary embodiment of a method of regulating pH according to the present invention includes: a) flowing a solution containing ions having a higher or lower standard oxidization potential than water into an anode chamber; b) flowing a solution containing ions having a lower standard oxidization potential than water into a cathode chamber; and c) regulating a pH of each of the solutions which flows into the anode chamber and cathode chamber by inducing electrolysis in each of the anode and cathode chambers by applying an electric current between anode and cathode electrodes.

In another exemplary embodiment of the pH regulating method according to the present invention, exemplary embodiments of anions having a lower standard oxidization potential than water, anions having a higher standard oxidization potential than water, and cations having a higher standard oxidization potential than water are the same as described above. Operations a) and b) above can be simultaneously or sequentially performed.

The pH of a fluid can be regulated according to the direction in which an electric current is applied, the magnitude of the electric current, the duration of the electric current application, the width of electrodes, and the thickness of the ion exchange membrane. The direction of an electric current, the magnitude of the electric current, the duration of the electric current application, the width of electrodes, and the thickness of the ion exchange material can be varied according to a target pH, the volume of the chamber, and other characteristics of the microfluidic device, and can be experimentally determined by one of ordinary skill in the art.

In an exemplary embodiment of the pH regulating method according to the present invention, since a cathode chamber solution containing a compound having a lower standard reduction potential than water is contained in the cathode chamber, water can be electrolyzed into a hydrogen gas and $OH^-$ ions. The hydrogen gas is adsorbed by the cathode electrode, for example, a palladium electrode, of the exemplary embodiment of a microfluidic device according to the present invention, and thus is not exhausted into the cathode chamber solution. As a result, the pH of the cathode chamber solution increases due to the $OH^-$ ions as described above.

In an exemplary embodiment of the pH regulating method according to the present invention, an anode chamber solution containing a compound having a lower standard oxidation potential than water is contained in the anode chamber and the anode electrode is formed of a metal which has a higher standard oxidization potential than, and does not react with, water. In such an exemplary embodiment water is not electrolyzed. Instead, the metal is oxidized into ions and does not generate gas. In addition, even if a small amount of oxygen is generated due to a specific condition, such as a rise in voltage, a change in solute, etc., it will combine with the metal and form a metal oxide. As a result, bubbles due to oxygen gas are not generated.

For the purpose of cell lysis, a sample solution containing NaCl is flowed into the anode and cathode chambers, and electrolysis is performed to lyse cells in the cathode chamber.

Hereinafter, the present invention will be described in more detail with reference to the following examples. However, these exemplary embodiments are for illustrative purposes only and are not intended to limit the scope of the invention.

EXAMPLE 1

Manufacture of a Microfluidic Device for pH Regulation According to the Present Invention An exemplary embodiment of a microfluidic device for regulating a pH according to the present invention having a structure as illustrated in FIG. 2 was manufactured.

Initially, a cathode electrode plated with palladium was manufactured using electrolytic plating. A substrate to which Au/Cr was fixed as a conductor was manufactured. The substrate was dipped in a palladium solution (5 g/L and pH 5.5), and the temperature of the substrate was maintained at 55° C. in a water bath. The solution was stirred to reduce or effectively prevent precipitation of palladium particles. A platinum-mesh was connected to an anode, and the substrate was connected to a cathode electrode parallel to the platinum-mesh, and a current was applied at a density of $1.0 \, A/dm^2$. As a result, platinum was plated to a thickness of about 10 μm at 0.4 μm/min. The substrate was cut to a size of 40 $mm^2$, thereby resulting in the cathode electrode.

A silver substrate having the same area as the cathode electrode was used as an anode electrode. A cation membrane containing $—SO_3—Na^+$ was used as an ion exchange membrane. The volume of each of cathode and anode chambers was 10 μL. As a result, the exemplary embodiment of a microfluidic device for regulating a pH according to the present invention was manufactured.

EXAMPLE 2

Manufacture of a Microfluidic Device for pH Regulation According to the Present Invention An exemplary embodiment of a microfluidic device for pH regulation was manufactured in the same manner as in Example 1, except that a copper substrate was used for the anode electrode.

EXAMPLE 3

Manufacture of a Microfluidic Device for pH Regulation According to the Present Invention An exemplary embodiment of a microfluidic device for pH regulation was manufactured in the same manner as in Example 1, except that a lead substrate was used for the anode electrode.

COMPARATIVE EXAMPLE 1

Manufacture of a Microfluidic Device for pH Regulation

A microfluidic device for pH regulation was manufactured in the same manner as in Example 1, except that a platinum substrate was used for both the cathode and anode electrodes.

COMPARATIVE EXAMPLE 2

Manufacture of a Microfluidic Device for pH Regulation

A microfluidic device for pH regulation was manufactured in the same manner as in Example 1, except that a platinum substrate was used for the anode electrode.

COMPARATIVE EXAMPLE 3

Manufacture of a Microfluidic Device for pH Regulation

A microfluidic device for pH regulation was manufactured in the same manner as in Example 1, except that a gold substrate was used for the anode electrode.

COMPARATIVE EXAMPLE 4

Manufacture of a Microfluidic Device for pH Regulation

A microfluidic device for pH regulation was manufactured in the same manner as in Example 1, except that an aluminum substrate was used for the anode electrode.

The materials of the cathode and anode electrodes of the microfluidic devices manufactured in Examples 1 through 3 and Comparative Examples 1 through 4 are summarized in Table 1.

TABLE 1

|  | Cathode Electrode | Anode Electrode |
| --- | --- | --- |
| Example 1 | Palladium | Silver |
| Example 2 | Palladium | Copper |
| Example 3 | Palladium | Lead |
| Comparative Example 1 | Platinum | Platinum |
| Comparative Example 2 | Palladium | Platinum |
| Comparative Example 3 | Palladium | Gold |
| Comparative Example 4 | Palladium | Aluminum |

EXPERIMENTAL EXAMPLE 1

Confirmation of Gas Generation and pH Change with Time

A measurement was made of the amount of gas generated in each of the chambers and a measurement was made of the change of pH in each of the chambers as a result of electrolysis in each of the microfluidic devices manufactured in Examples 1 through 3 and Comparative Examples 1 through 4.

Next, 10 µL of a 55 mM $Na_2SO_4$ solution was injected into each of the cathode and anode chambers of each of the microfluidic devices, and a current of 2 mA was applied across the cathode and anode electrodes.

The time at which gas generation started in each of the microfluidic devices, after the application of the 2 mA current, is shown in Table 2, and pH levels after 30 seconds from the application of the currents in each of the microfluidic devices is shown in Table 3.

As shown in Table 2, in Comparative Examples 1 through 3, gas was generated in a short time in one or both of the cathode and anode chambers. However, in Examples 1 through 3, utilizing an exemplary embodiment of the present invention, within the time duration of the measurement only the anode chamber of Example 1 showed signs of gas generation, and even then it took a comparatively long time. The other two exemplary embodiments of Examples 2 and 3 showed not signs of gas generation in either chamber for the duration of the measurement.

Moreover, as shown in Table 3, the pH of the anode chamber in each of the microfluidic devices according to Examples 1 through 3 was higher than in Comparative Examples 1 through 3. However, the pH in the cathode chamber, which is used for biomolecular treatment, such as cell lysis, was high in all of the microfluidic devices.

TABLE 2

|  | Cathode Chamber (second) | Anode Chamber (second) |
| --- | --- | --- |
| Example 1 | >1 min 30 sec | 1 min 12 sec |
| Example 2 | >1 min 30 sec | >1 min 30 sec |
| Example 3 | >1 min 30 sec | >1 min 30 sec |
| Comparative Example 1 | <1 sec | <1 sec |
| Comparative Example 2 | >1 min 30 sec | <1 sec |
| Comparative Example 3 | >1 min 30 sec | <1 sec |

TABLE 3

|  | Cathode Chamber (pH) | Anode Chamber (pH) |
| --- | --- | --- |
| Example 1 | >13 | <5 |
| Example 2 | >13 | <6 |
| Example 3 | >13 | <5 |
| Comparative Example 1 | >13 | <2 |
| Comparative Example 2 | >13 | <2 |
| Comparative Example 3 | >13 | <2 |

Figure 6A:
FIGS. 6A through 6C are photographs showing Pb, Cu, and Ag anode electrodes, respectively, which are oxidized after electrolysis is performed using a microfluidic device according to the present invention.
Figure 6B:
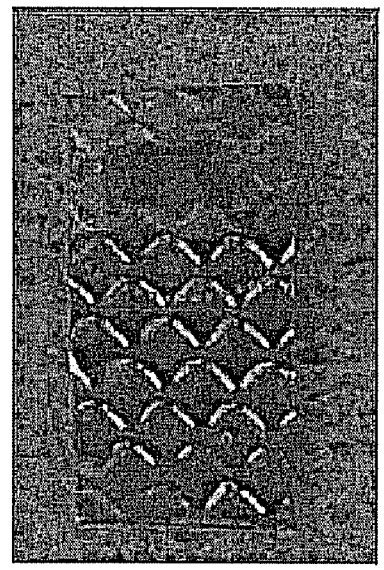
Figure 6C:

FIGS. 6A through 6C are photographs of Pb, Cu, and Ag anode electrodes which are oxidized as a result of electrolysis using microfluidic devices according to the present invention.

EXPERIMENTAL EXAMPLE 2

Measurement of Resistance of a Microfluidic Device

Next, 10 µL of a 55 mM $Na_2SO_4$ solution were injected into each of the cathode and anode chambers of the microfluidic devices, and resistance between the cathode and anode electrodes was measured.

As a result, the resistances of the exemplary embodiment of a microfluidic device according to Example 1 and the microfluidic devices of Comparative Examples 1 through 3 were about 400Ω, the resistance of the microfluidic device according to Example 2 was about 500Ω, and the resistance of the microfluidic device according to Example 3 was about 800Ω.

However, the resistance of the microfluidic device according to Comparative Example 4 was 5000Ω or larger. Additional experiments utilizing comparative microfluidic devices having an aluminum anode electrode and a cathode electrode formed of other metals, for example, platinum, gold, silver, copper, or lead, the resistance was 5000Ω or lager.

From the results above, it is apparent that the aluminum electrode causing such a high resistance is not suitable for electrolysis. It is believed that this is due to the relatively quick oxidation of aluminum.

EXPERIMENTAL EXAMPLE 3

Cytolysis Experiment Using Microfluidic Device

Cytolysis, which is involved in a series of biological analyses, was performed using the exemplary embodiment of a microfluidic device according to Example 2 and the microfluidic device of Comparative Example 1.

Initially, each of the cathode chamber and the anode chamber of the exemplary embodiment of a microfluidic device according to Example 2 and the microfluidic device of Comparative Example 1 were filled with a 55 mM $Na_2SO_4$ solution. Then, a culture of *E. coli* (BL21, Stratagen) in an amount equivalent to $OD_{600}=1.0$ was added into the cathode chamber.

A direct current ("DC") of 2 mA was applied to the exemplary embodiment of a microfluidic device according to Example 2 and the microfluidic device of Comparative Example 1 at room temperature for 30 seconds to perform electrolysis.

A real-time polymerase chain reaction ("RT-PCR") was performed using the solution obtained through the above processes as a template to lyse cells. The amount of deoxyribonucleic acid ("DNA") released as a result of the cell lysis was measured. A forward primer (FP: 5'-YCCAKACTC-CTACGGGAGGC-3') and a reverse primer (RP: 5'-GTAT-TACCGCRRCTGCTGGCAC-3') were used as primers.

The amount of DNA was measured using a crossing point ("Cp") obtained through real-time quantitative PCR. The smaller the Cp, the larger the initial amount of DNA. RT-PCR can easily detect DNA in a short time when the initial amount of DNA is large.

Figure 7:
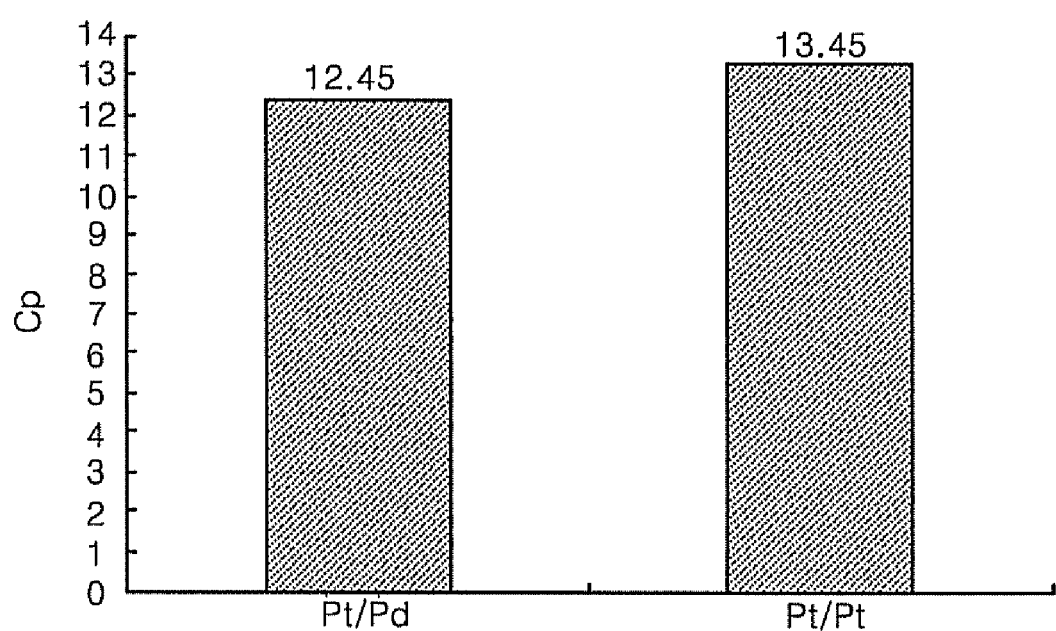
FIG. 7 is a graph showing the cytolysis capabilities of an exemplary embodiment of a microfluidic device according to the present invention and a microfluidic device according to a comparative example.

FIG. 7 is a graph of Cp comparatively showing the cell lysis capabilities of exemplary embodiment of the microfluidic device according to Example 2 and the microfluidic device according to Comparative Example 1.

Referring to FIG. 7, the exemplary embodiment of a microfluidic device according to Example 2 had a Cp value of 12.45, which is smaller than a Cp value of 13.45 of the microfluidic device according to Comparative Example 1. A cell solution used as a reference sample to which a current was not applied had a Cp value of 19.82. The results support that a pH of a chamber can be effectively regulated using a microfluidic device according to the present invention, and thus a series of biological analyses, including cell lysis, can be effectively performed while regulating pH.

As described above, in an exemplary embodiment of a microfluidic device according to the present invention, gas is not generated during electrolysis, and thus problems which may arise due to gas bubbles, such as interruption of flow of a solution, fluid control, mixing, reaction, and transfer of a material, such as heat, etc. are reduced or effectively prevented. In addition, a gas outlet and an additional degassing device are not required, which contributes to minimizing the microfluidic device. In a pH regulating method according to the present invention, a pH of a fluid in the microfluidic device can be quickly and easily regulated without generation of gas during electrolysis.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the present invention is defined not by the detailed description of the invention but by the appended claims, and all differences within the scope will be construed as being included in the present invention.

What is claimed is:

1. A microfluidic device which electrochemically regulates a pH of a fluid, the device comprising:
a chamber including a cathode chamber and an anode chamber,
wherein the cathode is formed of a metal which adsorbs hydrogen gas and the anode is formed of a metal which has a higher standard oxidation potential than water, and does not react with water.

2. The microfluidic device of claim 1, wherein the cathode is formed of palladium (Pd).

3. The microfluidic device of claim 1, wherein the anode is formed of a material selected from the group consisting of copper (Cu), lead (Pb), silver (Ag), chromium (Cr), titanium (Ti), nickel (Ni), zinc (Zn), iron (Fe), and tin (Sn).

4. The microfluidic device of claim 1, wherein the chamber further includes an ion exchange material which divides the chamber into the cathode chamber which includes the cathode electrode and the anode chamber which includes the anode electrode.

5. The microfluidic device of claim 4, wherein the ion exchange material transmits an electric current and substantially prevents the transmission of ions therethrough.

6. The microfluidic device of claim 4, wherein the ion exchange material forms a membrane substantially simultaneously with a crosslinking reaction.

7. The microfluidic device of claim 1, wherein the chamber further comprises a fluid inlet and a fluid outlet.

8. The microfluidic device of claim 1, wherein the chamber further comprises a micropump.

9. A method of electrochemically regulating a pH of a fluid in a microfluidic device comprising a chamber including a cathode, an anode and an ion exchange material which divides the chamber into a cathode chamber which includes the cathode electrode and an anode chamber which includes the anode electrode, and wherein the cathode is formed of a metal which adsorbs hydrogen gas and the anode is formed of a metal which has a higher standard oxidation potential than, and does not react with, water, the method comprising:
flowing a solution containing ions which have a higher or lower standard oxidization potential than water into the anode chamber;
flowing a solution containing ions which have a lower standard reduction potential than water into the cathode chamber; and
inducing electrolysis in each of the anode and cathode chambers by applying an electric current between the anode and cathode.

10. The method of claim 9, wherein the ions which have a lower standard oxidization potential than water are at least one selected from the group consisting of $NO_3^-$, $F^-$, $SO_4^{2-}$, $PO_4^{3-}$ and $CO_3^{2}$.

11. The method of claim 9, wherein the ions which have a higher standard oxidization potential than water are Cl—.

12. The method of claim 9, wherein the ions which have a lower standard reduction potential than water are at least one selected from the group consisting of $Na^+$, $K^+$, $Ca^{2+}$, $Mg^{2+}$, and $Al^{3+}$.

13. The method of claim 9, wherein the pH is regulated according to the direction in which an electric current is applied.

14. The method of claim 9, wherein the pH is regulated according to the magnitude of the electric current.

15. The method of claim 9, wherein the pH is regulated according to the duration of the application of the electric current.

16. The method of claim 9, wherein the pH is regulated according to the width of at least one of the anode and the cathode.

17. The method of claim 9, wherein the pH is regulated according to the thickness of the ion exchange material.

* * * * *